(No Model.)  5 Sheets—Sheet 1.

A. P. HOLMAN & F. BEAN.
MACHINE FOR UNITING SHEET MATERIALS.

No. 366,001. Patented July 5, 1887.

Witnesses.
Lauritz N. Möller
Carl N. Möller

Inventor
Albert P. Holman
and
Frank Bean,
by J. E. Maynadier
atty.

(No Model.)
A. P. HOLMAN & F. BEAN.
MACHINE FOR UNITING SHEET MATERIALS.
No. 366,001. Patented July 5, 1887.
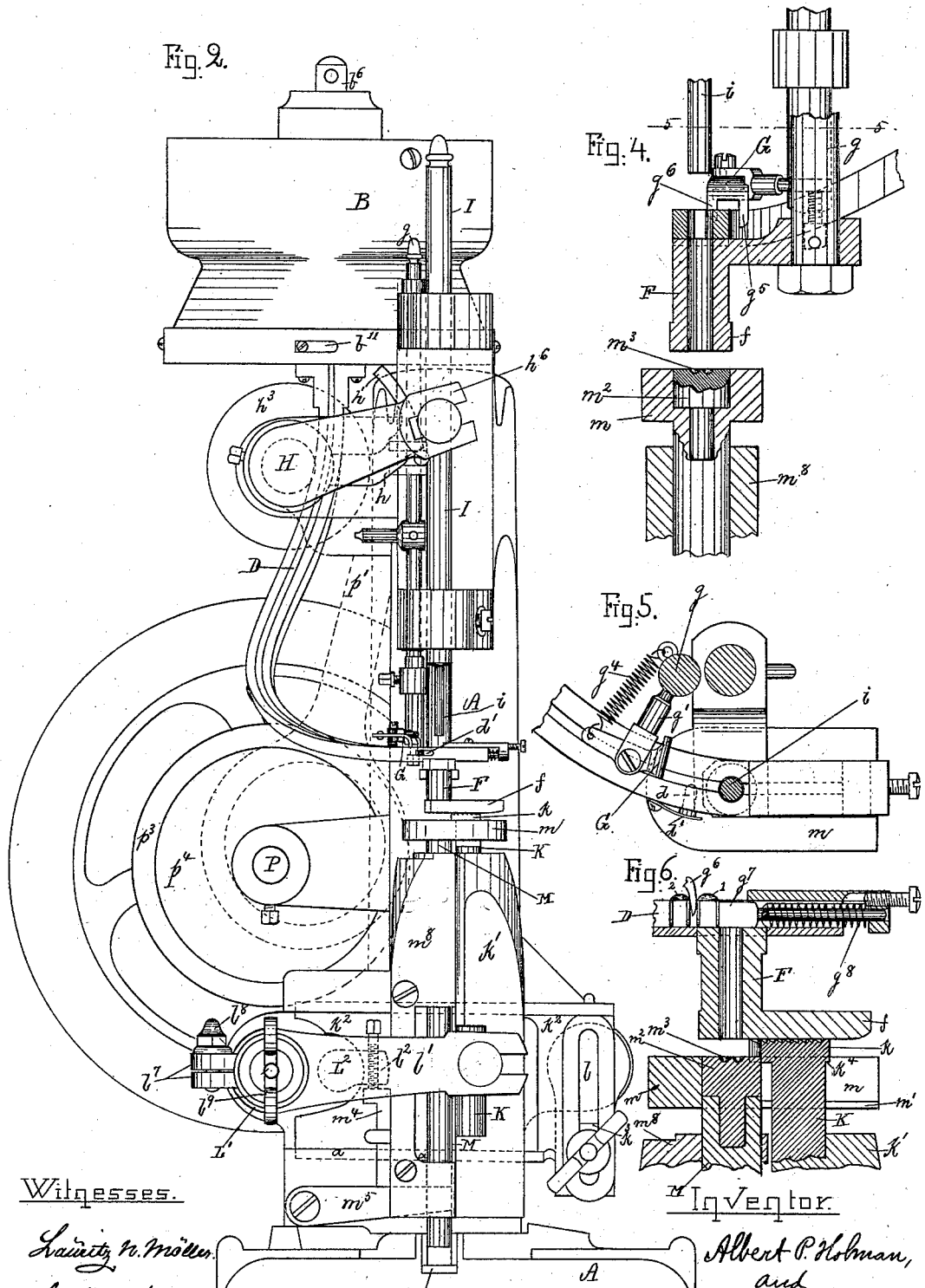

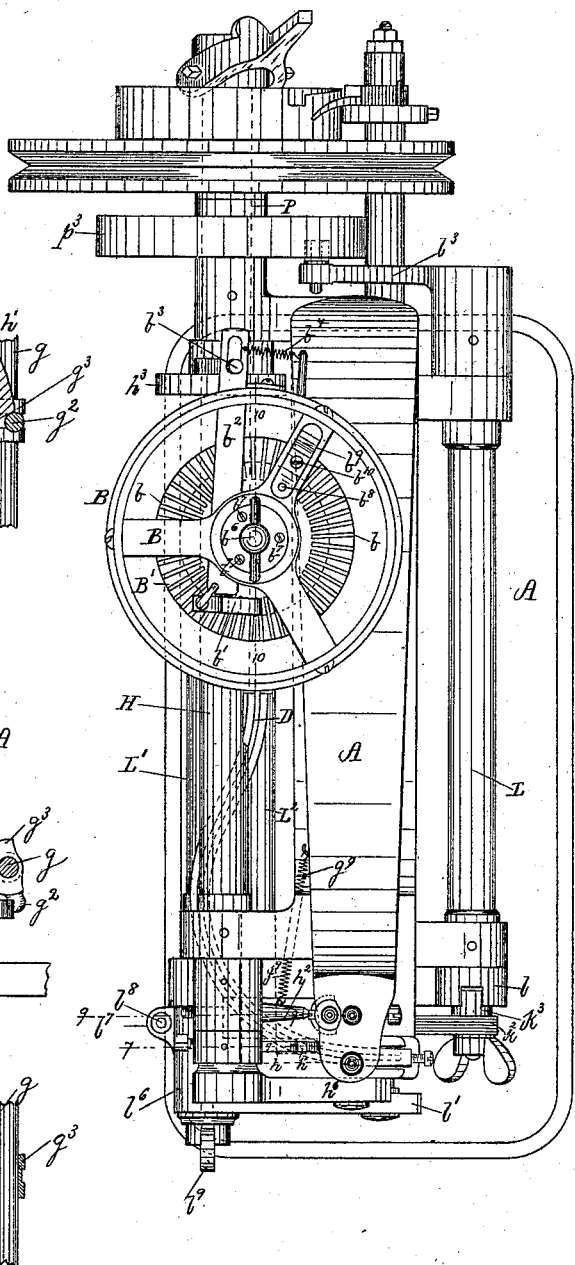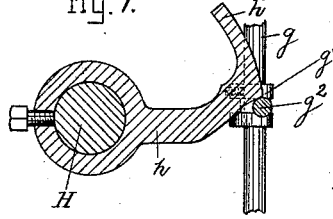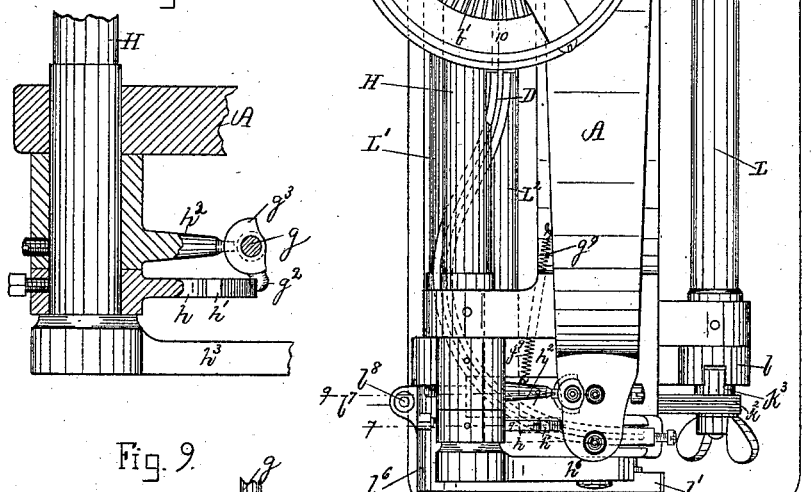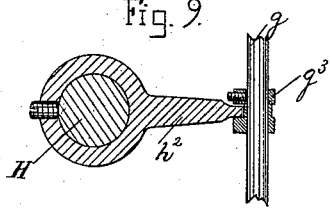

(No Model.) 5 Sheets—Sheet 4.

A. P. HOLMAN & F. BEAN.
MACHINE FOR UNITING SHEET MATERIALS.

No. 366,001. Patented July 5, 1887.

Witnesses. Inventor
Lauritz N. Möller Albert P. Holman,
Carl N. Möller and
Frank Bean
by J. E. Maynadier
atty (No Model.) 5 Sheets—Sheet 5.
A. P. HOLMAN & F. BEAN.
MACHINE FOR UNITING SHEET MATERIALS.
No. 366,001. Patented July 5, 1887.
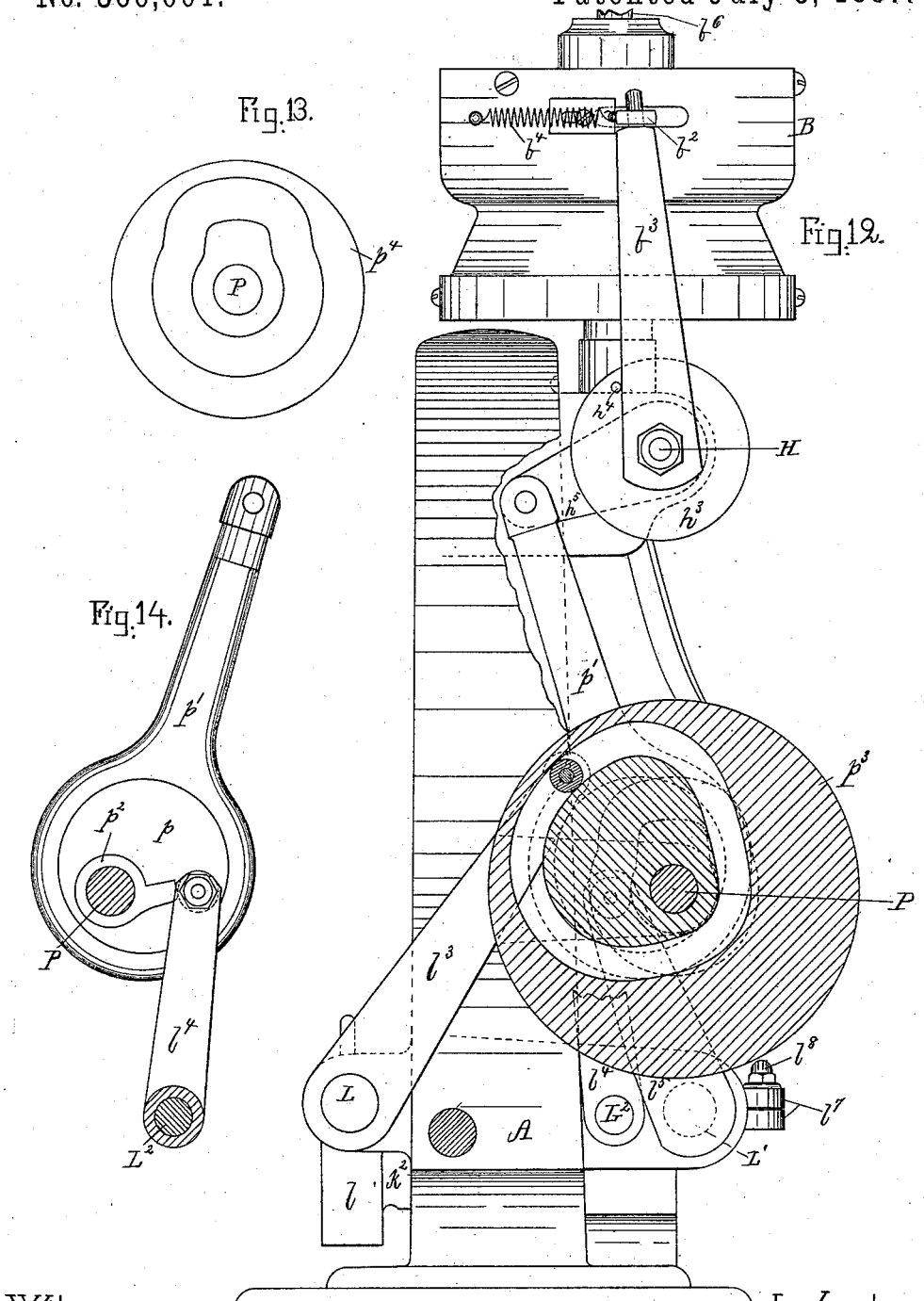
Witnesses.
Lauritz W. Möller.
Carl N. Möller.
Inventor.
Albert P. Holman, and
Frank Bean,
by J. E. Maynadier
atty

UNITED STATES PATENT OFFICE.

ALBERT P. HOLMAN AND FRANK BEAN, OF MEDFORD, ASSIGNORS TO SAID BEAN AND FRANK D. MARCH, OF CAMBRIDGE, MASSACHUSETTS.

MACHINE FOR UNITING SHEET MATERIALS.

SPECIFICATION forming part of Letters Patent No. 366,001, dated July 5, 1887.

Application filed September 17, 1886. Serial No. 213,840. (No model.)

*To all whom it may concern:*

Be it known that we, ALBERT P. HOLMAN and FRANK BEAN, both of Medford, in the county of Middlesex and State of Massachusetts, have invented a new and useful Machine for Uniting Sheet Materials, of which the following is a specification, reference being had to the accompanying drawings, in which—

Figure 1:
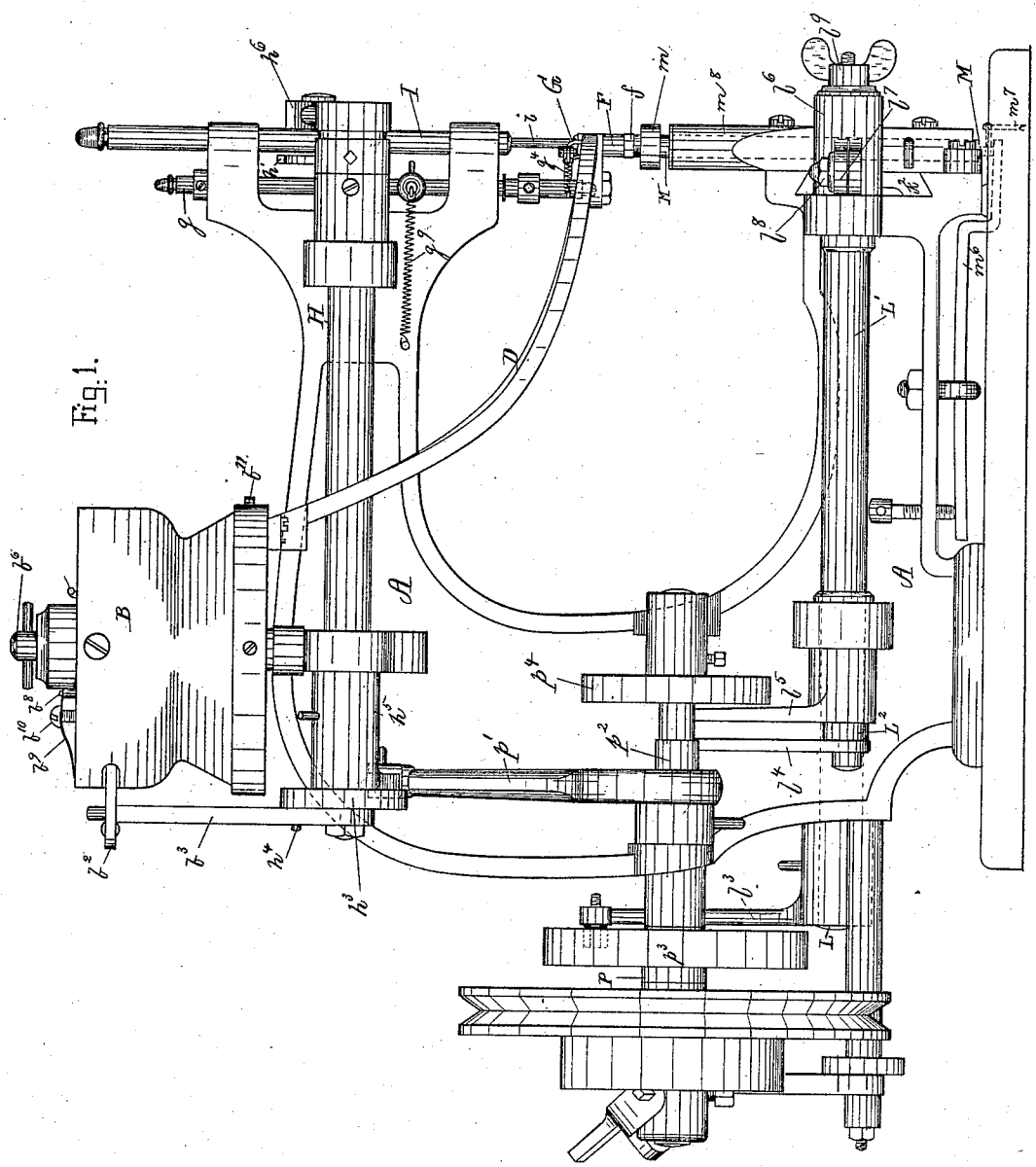
Figures 10, 11:
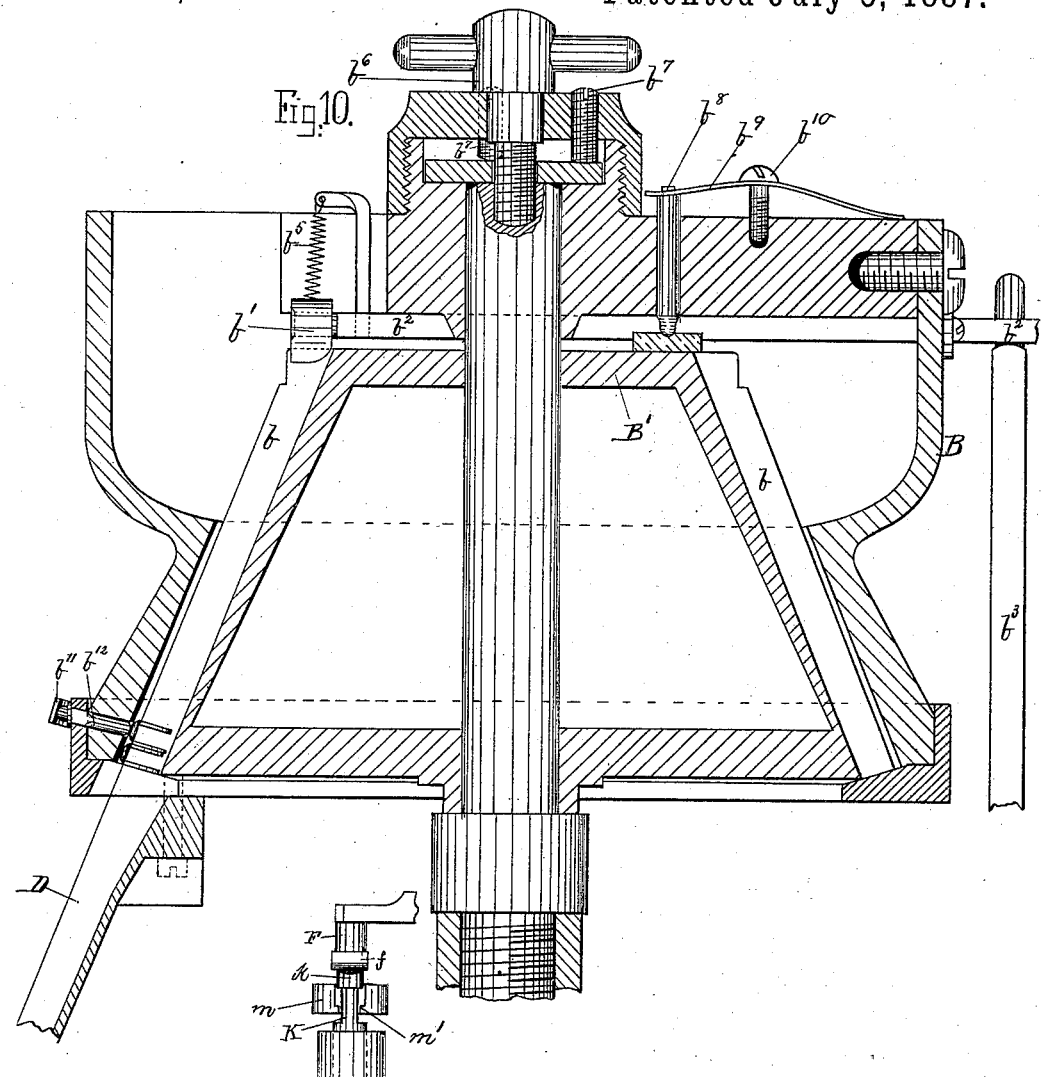

Figure 1 is a side elevation, Fig. 2 a front elevation, and Fig. 3 a plan, of our machine. Fig. 4 is a detail, partly in section, of our picking mechanism, tube, and anvil. Fig. 5 is a detail, partly in section, on line 5 5 of Fig. 4, of our picking mechanism and the chute. Fig. 6 is a sectional detail of a part of the picking mechanism, the tube, feed, and anvil. Fig. 7 is a detail, partly in section, on line 7 7 of Fig. 3; Fig. 8, a detail, partly in section, and Fig. 9 a sectional detail, on line 9 9, of Fig. 3. Fig. 10 is a central section of our carrier, its reservoir, and a portion of the chute on line 10 10 of Fig. 3. Figs. 11, 12, 13, and 14 are details.

Our invention is a machine, especially adapted for driving metallic fastenings with a cup-shaped head, and two legs projecting from the rim of the head; but some of the features of our invention are applicable to machines for driving other kinds of metallic fastenings.

Our machine consists of a mechanism for sorting the fastenings and arranging them in line in a chute or way, a mechanism for separating the lowermost fastening from those above it, a mechanism for presenting the lowermost fastening to and holding it under the driver until the driver strikes it and carries it down the tube through which it is driven, a mechanism for clinching the legs of the fastening, a driving mechanism, and a mechanism for feeding the material, and, with the exception of the driving mechanism, which is of the usual description, all these mechanisms are new with us and constitute features of our invention.

In the drawings, which show our invention embodied in the best way known to us, head or frame A is provided with a reservoir, B, from which a chute, D, leads to tube F, and the reservoir B and its appliances is our mechanism for getting the fastenings into line.

Reservoir B is provided with a carrier, B', grooved at $b$, and rotated within the reservoir by means of a pawl, $b'$, mounted on lever $b^2$, whose outer end is moved in one direction by a lever, $b^3$, which is connected to eccentric-rod $p'$ from eccentric $p$ on main shaft P by the intermediate parts, $h^3$ $h^4$ $h^5$, as will be plain to all skilled in the art. The outer end of lever $b^2$ is moved in the other direction by means of a spring, $b^4$. The spring $b^5$ serves to keep the point of pawl $b'$ in position to engage grooves $b$, so as to rotate carrier B' intermittently as the lever $b^2$ moves backward and forward. Reservoir B is made adjustable in relation to carrier B' (in order to regulate the distance between the exterior surface of the carrier and the interior surface of the reservoir according to the thickness of the heads of the fastenings) by means of the screw $b^6$ and set-screws $b^7$. (See Fig. 10.)

Picker G is mounted in an arm, $g'$, of rock-shaft $g$, which reciprocates vertically in frame A. Shaft $g$ is moved downward in its bearings by the downstroke of arm $h$ on rock-shaft H against projection $g^2$, and is also rocked in one direction after the engagement of arm $h$ with projection $g^2$ by the pushing of finger $h'$ against projection $g^2$. Shaft $g$ is rocked in the other direction by a spring, $g^9$, and is moved upward by means of arm $h^2$ on rock-shaft H, engaging shoulder $g^3$ on rock-shaft $g$, as will be readily understood without further description. The picker G is pinned in the end of its arm $g'$, and is provided with a spring, $g^4$, so that the picker during its back-stroke is guided by its fork $g^5$, which then just grazes chute D, so as to guide the picker in relation to the chute. This picker descending between the heads of the lowermost fastening and the one above it, and thereby separating the lowermost fastening from the others, is the novel feature of our mechanism for separating the lowermost fastening from the others in the line.

Our mechanism for presenting the lowermost fastening consists of the plunger $g^7$, controlled by a spring, $g^8$, so as to keep the head of the plunger over tube F. When picker G carries a fastening to tube F, the fastening is clamped between the picker and plunger, (so that the proper presentation of the fastening to the action of the driver is insured,) the plunger then moving back against its spring $g^8$, as will be plain without further description.

Driver-bar I, carrying driver $i$, is mounted in frame A, and is raised and lowered, so that driver $i$ plays through tube F by means of arm $h^6$, rigidly mounted on rock-shaft H, as will be plain to all skilled in the art. The face of anvil $m^2$ is provided with one or more cup-shaped indentations, $m^3$, corresponding to the number of legs of the fastenings driven, the points of which on striking the curving walls of the indentations are turned back into the material in a well-known way.

Our feed mechanism is novel, because the range of its motion toward and from the machine is caused by a friction device, and thereby varies with the thickness of the material. Feed-bar K is mounted in an enlargement, $k'$, of slide-block $k^2$, which is reciprocated in dovetail grooves $a$ by means of rock-shaft L, to which it is adjustably connected, so as to give a longer or shorter movement, as desired, to block $k^2$, carrying feed-bar K. The adjustable connection between the rock-shaft L and slide-block $k^2$ is made by providing the rock-shaft with an arm, $l$, having a lengthwise groove, in which slides a stud, $k^3$, whose outer end is clamped in a slot in block $k^2$. As block $k^2$ carries feed-bar K, it is obvious that the space between the fastenings driven depends on the adjustment of stud $k^3$. Shaft L is rocked by means of its arm $l^3$, having a roll at its outer end, and cam $p^3$ on the main shaft.

The feed-bar K is raised and lowered in its bearings by an arm, $l'$, of rock-shaft L'. In order to give the feed-bar a vertical reciprocation, depending on the thickness of stock, we connect arm $l'$ frictionally to rock-shaft L', so that the upward movement of the feed-bar is arrested by the pressure of the feed-bar against the stock under foot $f$. Arm $l'$ has a partially-split sleeve, $l^6$, which encompasses rock-shaft L', and is tightened or loosened thereon by a screw, $l^8$, through its ears $l^7$. Clamp-screw $l^9$ serves to keep arm $l'$ on rock-shaft L', and also aids in securing the arm $l'$ frictionally on the rock-shaft by clamping sleeve $l^6$ against a shoulder on the rock-shaft.

The downward movement of the feed-bar K is arrested by its shoulder $K^4$ coming in contact with shelf $m'$ on the inner surface of the arms of the presser-foot $m$ on presser-foot bar M. Presser-foot bar M, carrying presser-foot $m$ and anvil $m^2$, is mounted in block $m^3$, fast to main frame A, and is reciprocated vertically in its bearings by means of an arm, $l^2$, on rock-shaft $L^2$, which arm moves slide $m^4$ against a lever, $m^5$, one of whose ends is connected to presser-foot bar M. When cam $p^2$ passes out of contact with a roll on the outer end of arm $l^4$ on shaft $L^2$, presser-foot bar M is thrust upward by the resiliency of spring $m^6$. It is desirable to provide our machine with a treadle-rod, $m^7$, from presser-foot bar M, in order to the more conveniently separate the presser-foot from the foot when stock is put in.

The operation of our machine is as follows: A rotary motion is given to carrier B' by means above described, and the fastenings, being thrown about in the reservoir, fall point first into grooves $b$, and slide to the bottom of the grooves. The rotation of carrier B' is such that the carrier always rests with a groove, $b$, in line with the groove in chute D during the back-stroke of pawl $b'$, when the lowermost fastening in the grooves slides into the groove of the chute and down toward the tube F. The friction-pin $b^8$, controlled by a spring, $b^9$, and screw $b^{10}$, tends to insure the stopping of carrier B' with a groove, $b$, in line with the groove in the chute by preventing the carrier from rotating after pawl $b'$ has finished its forward stroke. The plunger $b^{12}$, controlled by spring $b^{11}$, projects into the reservoir above the opening into the chute and serves to prevent the fastenings above the lowermost fastening in the groove $b$ from sliding toward the chute, and so clogging the outlet into it. The fastenings are arrested in their descent in chute D by the plunger $d$, controlled by spring $d'$, projecting into the groove in the chute. When the chute is properly supplied with fastenings and the driver is up, stock is inserted between the foot $f$ and presser-foot $m$. Motion imparted to rock-shaft H through eccentric-rod $p'$ causes the picker and driver to descend nearly simultaneously, the descent of the picker being arrested as arm $h$ passes out of engagement with projection $g^2$, finger $g^6$ of the picker then being in the groove in chute D between the head of the lowermost fastening, 1, in the chute and head of the fastening 2 next back of it. (See Fig. 6.) The engagement of finger $h'$ with projection $g^2$ rocks shaft $g$ and causes picker G to sweep forward toward tube F, carrying fastening against and past the inner end of plunger $d$, which immediately re-enters the groove in chute D, owing to the resiliency of its spring $d'$. The picker carries the fastening against the head of plunger $g^7$, which moves back until the fastening is over tube F when the driver has descended, so as to be substantially in contact with the head of the fastening. Immediately after shaft H is rocked shaft $L^2$ is rocked through cam $p^2$ and arm $l^4$, and presser-foot $m$ is consequently moved downward and the feed takes place, the feed-bar being actuated horizontally through slide-block $k^2$, connected to arm $l$, rock-shaft L, arm $l^3$, and cam $p^3$ on the main shaft, and vertically through arm $l'$, rock-shaft L', arm $l^5$, and cam $p^4$ on the main shaft. The resiliency of spring $m^6$ gives presser-foot bar M an upward movement as soon as arm $l^2$ of rock-shaft $L^2$ has passed out of engagement with slide $m^4$, and the stock is firmly clamped against foot $f$ by both presser-foot $m$ and the face $k$ of feed-bar K during the driving and clinching of the fastening. Shaft H is now rocked in the other direction and driver $i$ moved upward out of tube F and picker G moved upward and back toward the chute, passing over the head of the lowermost fastening, to descend between the head of that fastening and the head of the fastening next above it at the next reverse motion of rock-shaft H.

What we claim as our invention is—

1. In combination, reservoir B, chute D, and carrier B', grooved at $b$, the diameter of the carrier being sufficiently less than the interior diameter of the reservoir to afford a space between the interior wall of the reservoir and the periphery of the carrier for the heads of fastenings projecting from grooves $b$, substantially as and for the purpose set forth.

2. In combination, chute D, tube F, picker G, and mechanism, substantially such as described, for operating the picker, a fork of the picker reciprocating vertically into and out of the groove in the chute between the heads of fastenings therein, and sweeping a fastening from the groove in the chute into the tube F, substantially as and for the purpose set forth.

3. In combination, chute D, tube F, picker G, and plunger $g^7$, the picker and plunger co-operating by mechanism, substantially such as described, to carry a fastening in the groove of the chute over the tube F and to hold it there for the action of the driver, as and for the purpose set forth.

4. Feed-bar F, in combination with lifting-arm $l'$, frictionally connected to its shaft L', and intermediate mechanism, all substantially as set forth.

ALBERT P. HOLMAN.
FRANK BEAN.

Witnesses:
FRANK D. MARCH,
EDWARD S. BEACH.